(12) United States Patent
Vandock et al.

(10) Patent No.: US 10,785,977 B2
(45) Date of Patent: Sep. 29, 2020

(54) METHODS AND COMPOSITIONS FOR ENVIRONMENTALLY FRIENDLY PEST CONTROL

(71) Applicant: BAYER CROPSCIENCE LP, Research Triangle Park, NC (US)

(72) Inventors: Kurt P. Vandock, Creedmoor, NC (US); Kenneth J. Essig, Wake Forest, NC (US)

(73) Assignee: Bayer CropScience LP, St. Louis, MO (US)

( * ) Notice: Subject to any disclaimer, the term of this patent is extended or adjusted under 35 U.S.C. 154(b) by 0 days.

(21) Appl. No.: 15/717,083

(22) Filed: Sep. 27, 2017

(65) Prior Publication Data

US 2018/0070588 A1    Mar. 15, 2018

Related U.S. Application Data

(63) Continuation of application No. 15/442,199, filed on Feb. 24, 2017.

(60) Provisional application No. 62/395,164, filed on Sep. 15, 2016.

(51) Int. Cl.
*A01N 37/02* (2006.01)
*A01N 37/36* (2006.01)

(52) U.S. Cl.
CPC .............. *A01N 37/02* (2013.01); *A01N 37/36* (2013.01)

(58) Field of Classification Search
None
See application file for complete search history.

(56) References Cited

U.S. PATENT DOCUMENTS

| | | | |
|---|---|---|---|
| 5,466,458 A | 11/1995 | Martin et al. | |
| 5,527,823 A | 6/1996 | Martin et al. | |
| 5,827,522 A | 10/1998 | Nowak | |
| 5,968,990 A | 10/1999 | Jon et al. | |
| 6,200,961 B1 | 3/2001 | Kostka et al. | |
| 6,231,865 B1 | 5/2001 | Hsu et al. | |
| 6,551,964 B1 * | 4/2003 | Bardsley | A01N 25/30 504/358 |
| 6,693,131 B2 | 2/2004 | Noeding et al. | |
| 8,119,150 B2 | 2/2012 | Tamarkin et al. | |
| 9,497,971 B2 | 11/2016 | Baker et al. | |
| 2008/0096763 A1 | 4/2008 | Dawson et al. | |
| 2008/0193387 A1 | 8/2008 | De Wolff | |
| 2008/0254988 A1 | 10/2008 | Wang et al. | |
| 2009/0163582 A1 | 6/2009 | Wang et al. | |
| 2009/0275601 A1 | 11/2009 | Taylor et al. | |
| 2009/0297871 A1 | 12/2009 | Crimp et al. | |
| 2010/0093715 A1 | 4/2010 | Voeste et al. | |
| 2010/0216641 A1 | 8/2010 | Wang et al. | |
| 2010/0322990 A1 | 12/2010 | Burke et al. | |
| 2012/0053151 A1 | 3/2012 | Pedersen | |
| 2013/0183261 A1 | 7/2013 | Harada et al. | |
| 2013/0217579 A1 | 8/2013 | Wacker et al. | |
| 2013/0345110 A1 | 12/2013 | Volont et al. | |
| 2014/0013654 A1 | 1/2014 | Burke | |
| 2014/0031424 A1 | 1/2014 | Humphrey et al. | |
| 2015/0250166 A1 | 9/2015 | Goldblum et al. | |
| 2016/0242418 A1 | 8/2016 | Baker et al. | |

FOREIGN PATENT DOCUMENTS

| | | |
|---|---|---|
| EP | 1337146 B1 | 2/2006 |
| WO | 201304449 A1 | 4/2013 |
| WO | 2014049347 A1 | 4/2014 |
| WO | 2014063109 * | 4/2014 |

OTHER PUBLICATIONS

Inert Ingredients Eligible for FIFRA 25(b) Pesticide Products (Updated Dec. 2015) (Year: 2015).*
40 CFR 152.25 (CFR) 2015 edition (Year: 2015).*
Sigma-Aldrich, Product Specification Sheet for Tributyl 0-acetylcitrate, Nov. 23, 2010.
"Find the Repellent that is Right for You. Repellents: Protection against Mosquitoes, Ticks, and Other Arthropods" US EPA. (Feb. 2016). Entire document. p. 1-3.
National Pesticide Information Retrieval System. PC Code: 30806. (2015) Entire document. p. 1 of 1.
"Volatile organic compounds (VOC) means any compound of carbon excluding carbon monoxide, carbon dioxide . . . " List of Exempt Compounds. Attachment E. (Jul. 1, 2003) Entire document. p. 1 of 1.
International Search Report issued in counterpart Application No. PCT/US1750413, dated Nov. 21, 2017.

* cited by examiner

*Primary Examiner* — Karl J Puttlitz
(74) *Attorney, Agent, or Firm* — McBee Moore & Vanik IP, LLC

(57) ABSTRACT

Formulations are provided containing no VOC's or alternatively are low in VOC's for wide area space spray to control mosquitoes, flies, and other public health pests. When applied as an ultra-low volume (ULV) spray, these formulations have been observed to provide significantly superior control of pests.

**28 Claims, No Drawings

METHODS AND COMPOSITIONS FOR ENVIRONMENTALLY FRIENDLY PEST CONTROL

CROSS REFERENCE TO RELATED APPLICATIONS

This application is a Continuation of U.S. application Ser. No. 15/442,199, filed Feb. 24, 2017, which claims priority to U.S. Provisional Application No. 62/395,164, filed Sep. 15, 2016, the contents of which are hereby incorporated by reference in its entirety.

BACKGROUND

1. Field

The present disclosure relates to spray formulations, especially pesticidal formulations of the sort which may be diluted with water to form a sprayable preparation, for example, a pressure pack ("aerosol") preparation or a spray, particularly an ultra-low volume (ULV) spray for domestic, horticultural, agricultural, environmental, or industrial use. In particular, the present disclosure relates to pesticidal formulations devoid of Volatile Organic Compounds.

2. Description of Related Art

Water-based sprays are advantageous because they cost less than oil-based sprays and are often less toxic to mammals. However, particularly when the ambient temperature is high, the water in the spray droplets evaporates and the droplets become smaller and drift more readily from the area being sprayed. The size of the droplets is frequently specially chosen to suit the application, for example to maximize droplet adherence to flying insects or adherence to plant foliage, to increase bio-availability, or to control the size of the area being sprayed and the delivery rate per square meter; such care is pointless if the spray droplets change size, possibly unpredictably, following spraying.

Water-in-oil emulsions or oil-in-water emulsions are typically used in water-based sprays due to the low solubility of most pesticides in water. Volatile Organic Compound (VOC) regulations, however, have limited the compounds that are available to formulate water-in-oil emulsions suitable for pesticide applications. Thus, there is a significant need to develop further pesticidal formulations with low VOC content.

To this end, non-VOC insecticide formulations have been described comprising at least one active ingredient and at least one solvent. See U.S. Patent Publication No. 2016-0242418.

It is widely believed that chemical pesticides are of critical importance in maintaining control of diseases spread by mosquitoes and other insects, particularly in developing countries. However, there is growing resistance to the most commonly used chemical pesticides, including pyrethroids, DDT, carbamates, and organophosphates. Thus, it is critical to develop pesticidal formulations that do not rely on traditional chemical pesticides.

The solution to this technical problem is provided by the embodiments characterized in the claims.

BRIEF SUMMARY OF THE INVENTION

The present application relates to spray formulations, especially pesticidal formulations of the sort which may be diluted with water to form a sprayable preparation, for example, a pressure pack ("aerosol") preparation or a spray, particularly an ultra-low volume (ULV) spray for domestic, horticultural, agricultural, environmental, or industrial use. In particular, the present disclosure relates to pesticidal formulations devoid of Volatile Organic Compounds (VOC).

In particular, the present application provides spray formulations comprising at least one solvent, wherein said formulations are essentially free of one or more currently registered pesticide(s).

The spray formulations optionally comprise an essential oil, an active ingredient, a humectant, an emulsifier, a surfactant, an anti-foam agent, a preservative and/or water, together with other ingredients such as perfumes, dyes, solids (e.g., to form wettable powders) and thickeners. The active ingredient preferably is an active ingredient eligible for minimum risk exemption regulations of the EPA (40 C.F.R. 152.25(f)(1)).

Sprays in accordance with the invention are particularly suitable for spraying buildings, residential or commercial areas, and insect breeding grounds (such as swamps and other tracts of water) with insecticide and for spraying crops with herbicides, insecticides, fungicides, and plant growth regulators.

The sprays may be delivered by pumping through a nozzle, especially a sonic nozzle, by pumping over an ultrasonic nebulizer, or via a spinning disc. The droplets may be electro-statically charged, if desired.

Suitable solvents are Volatile Organic Compounds (VOC)-exempt or contain no VOCs. Suitable non-VOC solvents include, but are not limited to, acetate esters, methyl esters, citric acid esters such as acetyl-tributyl citrate, isoparaffinic fluids, paraffinic fluids, vegetable oils such as canola oil, cotton seed oil, soybean oil and the like, and mixtures thereof. Suitable VOC-exempt solvents include, but are not limited to, monoethylene, diethylene, triethylene, tetraethylene glycols, and polyethylene glycols such as PEG 300 and above. Preferably, the solvent is a citric acid ester. More preferably, the solvent is acetyl-tributyl citrate.

DETAILED DESCRIPTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

The term "spray formulation" is defined as a formulation, especially pesticidal formulations, of the sort which may be diluted with water to form a sprayable preparation, for example, a pressure pack ("aerosol") preparation or a spray, particularly an ultra-low volume (ULV) spray for domestic, horticultural, agricultural, environmental or industrial use.

The term "currently registered pesticide" is defined as any pesticide registered with the U.S. Environmental Protection Agency (EPA) as of the filing date of the application.

The term "volume mean diameter" or "VmD" is defined as the midpoint droplet size (mean), where half of the volume of spray is in droplets smaller, and half of the volume is in droplets larger than the mean.

The terms "VOC-exempt" and "Volatile organic compound-exempt" are used interchangeably throughout this specification and the appended claims and are defined according to the definition under U.S. Environmental Protection Agency (EPA) regulations under 40 C.F.R. 59.203(f). These EPA regulations define a chemical as "VOC-exempt" if it has vapor pressure of less than 0.1 millimeters of mercury (at 20° C.). If the vapor pressure is unknown, a chemical is defined as "VOC-exempt" if it a) consists of more than 12 carbon atoms; or b) has a melting point higher than 20° C. and does not sublime (i.e., does not change directly from a solid into a gas without melting).

ULV sprays are generally used in space spray insecticides to treat or fog areas to kill adult mosquitos. Typically, a ULV concentrate comprising an insecticide is diluted and atomized by a ULV fogging machine. The insecticide would then be released from the ground or from the air. Air currents would carry the droplets downwind of the application equipment. The droplets would collide with the insects, coating the insect with a lethal dose of the active ingredient.

Water dilutable insecticides and/or ULV concentrates include formulations such as the FFAST™ (an acronym for Film Forming Aqueous Spray Technology) insecticide formulations described in U.S. Pat. Nos. 5,466,458, 5,527,823, and 6,302,161 allow for the use of water as a diluent. These patents are hereby incorporated by reference.

It is generally less expensive and more desirable to have the option of using a water-based product. However, at ambient temperatures, conventional water-based sprays tend to evaporate quickly and fail to deliver the insecticide to the target insects or pests efficiently. To overcome this problem in the past, dispersing insecticides in water required the creation of large droplets. However, these large droplets did not drift efficiently and did not reach the target at all.

A formulation, such as the FFAST™ formulation, using long chain alcohol molecules to form a protective film around each droplet of insecticide as it leaves the nozzle of the sprayer, allows for the formation of droplets that do not evaporate too quickly and that efficiently deliver the insecticide to the target insect. The incorporation of long chain alcohols into the formulation provides a means of coating the individual droplets of insecticides when mixed with water so as to control the rate of evaporation. This film retards the evaporation of the droplets and they maintain the desired optimum size.

The subject disclosure features, in one aspect, spray formulations comprising at least one solvent, wherein said formulations are essentially free of one or more currently registered pesticide(s). In a preferred embodiment, the spray formulations are Volatile Organic Compounds (VOC)-exempt or alternatively, contain no VOCs. The U.S. Environmental Protection Agency (EPA) identifies a VOC as an organic compound that participates in atmospheric photochemical reactions, but makes exceptions for compounds that have negligible photochemical reactivity. VOCs are emitted as gases from certain solids or liquids. They include a variety of chemicals, some of which may have short- and long-term adverse health effects. Conventional emulsified pesticide formulations generally contain 50-90% by weight VOCs. Current regulations from the California Department of Pesticide Regulation and from the U.S. Environmental Protection Agency (EPA) recommend that pesticides are formulated to contain 20% by weight VOC, or less.

VOC content may be measured by any method known in the art. Several states, including California, evaluate methods and maintain lists of approved tests available for determining VOC content. One established method of determining the VOC content is a gas chromatographic analysis in accordance with DIN EN ISO 11890-2.

Thus, in a preferred embodiment, the spray formulations are low in VOC. In particular, the spray formulations contain ≤16% VOC by weight. In a more preferred embodiment, the spray formulations contain ≤10% VOC by weight, ≤5% VOC by weight, or ≤2.5% VOC by weight.

In a more preferred embodiment, the spray formulations are devoid or essentially devoid of VOC by weight. In particular, the spray formulations contain ≤1% VOC by weight. Optionally, the spray formulations contain ≤0.5% VOC by weight, ≤0.25% VOC by weight, ≤0.1% VOC by weight, or ≤0.05% VOC by weight.

Suitable solvents are Volatile Organic Compounds (VOC)-exempt or contain no VOCs. Suitable non-VOC solvents include, but are not limited to, acetate esters, methyl esters, citric acid esters such as acetyl-tributyl citrate, isoparaffinic fluids, paraffinic fluids, vegetable oils such as canola oil, cotton seed oil, soybean oil and the like, and mixtures thereof. Suitable VOC-exempt solvents include, but are not limited to, monoethylene, diethylene, triethylene, tetraethylene glycols, and polyethylene glycols such as PEG 300 and above.

In some embodiments, the solvent is a citric acid ester. Examples of citric acid esters include, but are not limited to, triethyl citrate (such as Citroflex® 2, Vertellus, Indianapolis, Ind.), tributyl citrate (such as Citroflex® 4, Vertellus, Indianapolis, Ind.), acetyl triethyl citrate (such as Citroflex® A2, Vertellus, Indianapolis, Ind.), acetyl tributyl citrate (such as Citroflex® A4, Vertellus, Indianapolis, Ind.), N-butyryl tri-N-hexyl citrate (such as Citroflex® B6, Vertellus, Indianapolis, Ind.), tri-C12-13 alkyl citrate, tri-C14-15 alkyl citrate, tricaprylyl citrate, triethylhexyl citrate, triisocetyl citrate, triictyldodecyl citrate, triisostearyl citrate, isodecyl citrate, isopropyl citrate, stearyl citrate, dilauryl citrate, and mixtures thereof. The solvent can, optionally, be a mixture of any tri- di- and monoethyl citrates.

In a preferred embodiment, the solvent is tributyl citrate. In a more preferred embodiment, the solvent is acetyl tributyl citrate (such as Citroflex® A4, Vertellus, Indianapolis Ind.).

The spray formulations optionally comprise an essential oil, an active ingredient, a synergist, a humectant, an emulsifier, a surfactant, an anti-foam agent, a preservative and/or water. The active ingredient preferably is an active ingredient eligible for minimum risk exemption regulations of the EPA (40 C.F.R. 152.25(f)(1)).

The spray formulations optionally comprise one or more essential oils. Examples of essential oils include, but are not limited to, rosemary oil, peppermint oil, spearmint oil, thyme oil, clove oil, lemongrass oil, pennyroyal oil, vetiver oil, basil oil, cedar oil, verbena oil, garlic oil, geranium oil, rose geranium oil, pine oil, cinnamon oil, catnip oil, *Artemisia vulgaris* oil, *Melaleuca leucadendron* oil, *Pelargonium roseum* oil, *Lavandula angustifolia* oil, *Mentha piperita* oil, *Juniperus virginiana* oil, *Mentha* spp. oil, *eucalyptus* oil, citronella oil, *Cinnamomum zeylanicum* oil, *Cinnamomum* spp. oil, *Cymbopogon citratus* oil, *Lavandula angustifolia* syn. oil *L. officinalis* oil, *Tanacetum vulgare* oil, *Rabdosia melissoides* oil, *Acorus calamus* oil, *Eugenia caryophyllata* oil, *Ocimum* spp. oil, *Gaultheria procumbens* oil, *Cuminum cyminum* oil, *Bunium persicum* oil, *Trachyspermum ammi* oil, *Foeniculum vulgare* oil, *Abelmoschus moschatus* oil,

*Cedrus* spp. oil, *Piper* spp. oil, *Ocimum sanctum* oil, *Satureja hortensis* oil, *Thymus serpyllum* oil, *Origanum creticum* oil, *Ageratum conyzoides* oil, *Aegle marmelos* oil, *Lippia alba* oil, *Rosmarinus officinalis* oil, lemon oil, lime oil, citrus oil, rose oil, lavender oil, dill (*Anethum sowa*) oil *Anethum graveolens* oil, *Mentha spicata* oil, *Nepeta cataria* oil, turmeric (*Curcuma longa*) oil, ginger oil, grapefruit oil, orange oil, hyssop oil, sage oil, tansy oil, patchouli oil, sandalwood oil, cypress oil, blue cypress oil, myrrh oil, sweet myrrh oil, neem oil, Alaska yellow cedar (*Chamaecyparis nootkatensis*) oil, Japanese honeysuckle oil, honeysuckle oil, tea tree oil, palmarosa oil, marigold oil, *Tagetes patula* oil, and combinations thereof. The essential oil may be isolated from one or more plant parts, including, but not limited to, leaves, stems, bark, flowers, roots, seeds, and/or fruits.

The spray formulations may optionally comprise one or more active components isolated from one or more essential oils. Examples of active components isolated from one or more essential oils include, but are not limited to, eugenol, geraniol, menthol, thymol, carvone, dillapiole, myrcene, α-terpinene, α-phllandrene, limonene, p-cymene, α-pinene, caryophyllene, citronellal, citral, cinnamaldehyde, perillaldehyde, cuminaldehyde, ethyl vanillin, vanillin, camphor, pulegone, menthone, thujone, linalool, nerol, citronellol, terpine-4-ol, borneol, farnesol, nerolidol, phenylethyl alcohol, cinnamic alcohol, carvacrol, anethole, estragole, isoeugenol, safrole, linalyl acetate, neryl acetate, fenchone, citronellyl acetate, 1,8-cineole, asarone, nootkatone, α-phellandrene, α-turmerone, turmerol, α-zingiberene, β-zingiberene, ar-d-curcumene, β-sesquiphellandrene, α-atlantone, nepetalactone, apiol, carveol, verbenone, and verbenol. Further examples of active components isolated from one or more essential oils include, but are not limited to, terpenes (hydrocarbons) such as myrecene, pinene, terpinene, limonene, p-cymene, α- and β-phellandrene etc.; and terpenoids (oxygen containing hydrocarbons) such as acyclic monoterpene alcohols (e.g., geraniol, linalool), monocyclic alcohols (e.g., menthol, 4-carvomenthenol, terpineol, carveol, borneol), aliphatic aldehydes (e.g., citral, citronellal, perillaldehyde), aromatic phenols (e.g., carvacrol, thymol, safrole, eugenol), bicyclic alcohols (e.g., verbenol), monocyclic ketones (e.g., menthone, pulegone, carvone), bicyclic monoterpenic ketones (e.g., thujone, verbenone, fenchone), acids (e.g., citronellic acid, cinnamic acid) and esters (e.g., linalyl acetate). Some essential oils may also contain oxides (e.g., 1,8-cineole), sulfur containing constituents, methyl anthranilate, coumarins, etc. Zingiberene, curcumene, farnesol, sesquiphellandrene, termerone, and nerolidol are some examples of sesquiterpenes (C15) isolated from essential oils.

The spray formulations may optionally comprise one or more of the following: castor oil, corn oil, cornmint oil, cottonseed oil, linseed oil, sesame oil, soybean oil, 2-phenylpropionate, citric acid, malic acid, and/or potassium sorbate.

The spray formulations optionally comprise an active ingredient. The active ingredient may be a currently registered pesticide such as an acaricide, herbicide, fungicide, plant growth regulator, insect behavior modifier, or biological control agent (e.g. viruses, bacteria, and eggs of parasites). The active ingredient may also be a dye, perfume, bactericide, lubricant, medicament, paint, polish, lacquer (including hair lacquer), textile treatment (including sizes), or other compound to be sprayed in a water-based formulation.

If included in the spray formulation, the active ingredient preferably is an active ingredient eligible for minimum risk exemption regulations of the EPA (40 C.F.R. 152.25(f)(1)). A list of active ingredients eligible for minimum risk exemption regulations of the EPA (40 C.F.R. 152.25(f)(1)) is available at epa.gov/minimum-risk-pesticides/active-ingredients-eligible-minimum-risk-pesticide-products. Examples of active ingredients eligible for minimum risk exemption regulations of the EPA (40 C.F.R. 152.25(f)(1)) include, but are not limited to, castor oil, cedarwood oil, cedarwood oil (China), cedarwood oil (Texas), cedarwood oil (Virginia), cinnamon, cinnamon oil, citric acid (2-hydroxypropane-1, 2,3-tricarboxylic acid), citronella, citronella oil, cloves, clove oil, corn gluten meal, corn oil, cornmint, cornmint oil, cottonseed oil, dried blood, eugenol (4-allyl-2-methoxyphenol), garlic, garlic oil, geraniol (2E)-3,7-dimethylocta-2,6-dien-1-ol), geranium oil, lauryl sulfate lemongrass oil, linseed oil, malic acid (2-hydroxybutanedioic acid), peppermint, peppermint oil, 2-phenylethyl propionate, potassium sorbate (potassium (2E,4E)-hexa-2,4-dienoate), putrescent whole egg solids, rosemary, rosemary oil, sesame, sesame oil, sodium chloride, sodium lauryl sulfate (sulfuric acid monododecyl ester, sodium salt), soybean oil, spearmint, spearmint oil, thyme, thyme oil, white pepper, and/or zinc.

In preferred embodiments, the formulations of the invention are essentially free of currently registered pesticides. In certain embodiments, the spray formulations contain less than 0.1% by weight of one or more currently registered pesticide(s). In a preferred embodiment, the spray formulations contain less than 0.01% by weight of one or more currently registered pesticide(s). In a more preferred embodiment, the spray formulations contain less than 0.001% by weight of one or more currently registered pesticide(s). In a more preferred embodiment, the spray formulations contain less than 0.0001% by weight of one or more currently registered pesticide(s).

In some embodiments, the spray formulations of the invention contain less than 0.1% by weight of all currently registered pesticides. In a preferred embodiment, the spray formulations contain less than 0.01% by weight of all currently registered pesticides. In a more preferred embodiment, the spray formulations contain less than 0.001% by weight of all currently registered pesticides. In a more preferred embodiment, the spray formulations contain less than 0.0001% by weight of all currently registered pesticides.

If present, the pesticide may be a pyrethroid, an organophosphate, a carbamate, an organochlorine, a lipid amide, a bicyclooctane, a dithiane, a pyrethrin, a pyrethrum, a chloronicotinic, a pyrazole, butenolide, a terpenoid, a fiprole, a tetramic acid derivative (ketoenol), a tetranilliprole, or a biological insecticide.

In a preferred embodiment, the spray formulations of the invention contain less than 0.1% by weight of all currently registered pesticides. Currently registered pesticides include, but are not limited to, pyrethroids (such as permethrin, deltamethrin, cypermethrin (including alphamethrin, the allethrins, fenvalerate, transfluthrin, and cyfluthrin), organophosphates (such as ethion, chlorfenvinphos, chlorpyrifos (methyl) or coumaphos), carbamates, organochlorines (such as DDT, dieldrin, dicofol, chlorpropylate, or tetradifon), lipid amides, bicyclooctanes, dithianes, pyrethrins, pyrethrum, chloronicotinics, pyrazoles, butenolides, terpenoids, fiproles, tetramic acid derivatives (ketoenols), tetranilliproles, or biological insecticides. Suitable herbicides include glyphosate. Suitable larvicides (IGRs, biologics) include methoprene, *Bacillus thuringiensis israelensis* (Bti), *Bacillus sphaericus* (Bs), organophosphates (such as temephos), and pyriproxyfen.

Currently registered pesticides include one or more pyrethroid. Examples of pyrethroid insecticides include those of the formula (I)

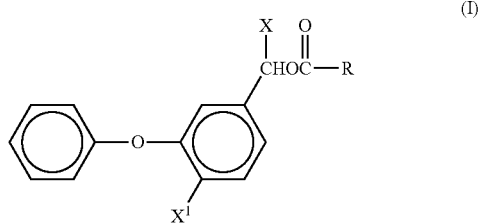

where R is

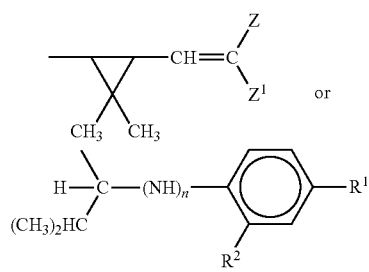

and n is 0 or 1,
$R^1$ is halo $CR_3$ or $CHF_2O$, R2 is hydrogen or halo, and Z and $Z^1$ are each independently selected from halo, $CF_3$ and methyl, X is hydrogen or halo, and X is H, CN or C=CH

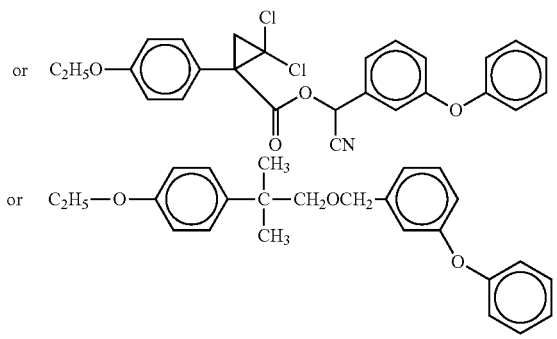

Examples of pyrethroids include, but are not limited to, 3-phenobenzyl-(1RS)-cis,trans-3-(2,2-dichlorovinyl-2,2-di-methyl-cyclopropane-1-carboxylate (permethrin), (RS)-α-cyano-3-phenoxybenzyl-(1RS)-cis,trans-3-(2,2-dichlorovi-nyl)-2,2-dimethylcyclopropane-1-carboxylate (cypermethrin) and its individual isomers such as the (1RS) cis isomer (alphamethrin), (S)-α-cyano-3-phenoxybenzyl-(IR)-cis-3-(2,2-dibromovinyl)-2,2-dimethyl cyclopropane-1-carboxylate (deltamethrin), or a reaction mixture comprising two enantiomeric pairs in approximately ratio 2:3 (S)-α-cyano-3-phenoxybenzyl-(IR)-cis-3-(2,2-dichlorovinyl)-2, 2-dimethylcyclopropanecarboxylate and (R)-α-cyano-3-phenoxybenzyl-(IS)-cis-3-(2,2-dichlorovinyl)-2,2-dimethylcyclopropanecarboxylate with (S)-α=cyano-3-phenoxybenzyl-(IR)-trans-3-(2,2-dichlorovinyl)-2,2-dimethylcyclopropanecarboxylate and (R)-α-cyano-3-phenoxybenzyl-(IS)-trans-3-(2,2-dichlorovinyl)-2,2-dimethylcyclopropanecarboxylate (beta-cypermethrin), (RS)-α-cyano-3-phenoxybenzyl-(Z)-(1RS)-cis-3-(2-chloro-3,3,3-trifiuoro propenyl)-2,2-dimethylcyclopropanecarboxylate (cyhalothrin) and a mixture of its (S)(Z)—(IR)-cis and (R)(Z)—(IS)-cis isomers; (RS)-α-cyano-3-phenoxybenzyl (RS)-2-(4-chlorophenyl)-3-methylbutyrate (fenvalerate) and the single (S), (S) isomer (esfenvalerate) (RS)-α-cyano-3-phenoxybenzyl (S)-2-(4-difluoromethoxyphenyl)-3-methyl butyrate (flucythinate), (RS)-α-cyano-3-phenoxybenzyl N(2-chloro-α,α,α-trifluoro-p-tolyl)-D-valinate (fluvalinate), (RS)-α-cyano-4-fluoro-3-phenoxybenzyl(IRS)-cis-trans-3-(2,2-dichlorovinyl)-2,2-dimethylcyclopropanecarboxylate (cyfluthrin), (RS)-α-cyano-4-fluoro-3-phenoxybenzyl (IRS)-cis-trans-3-(2-chloro-2(4-chlorophenyl)vinyl)-2,2-dimethylcyclopropanecarboxylate (flumethrin), 2-methylbiphenyl-3-yl-methyl(Z)—(IRS,3RS)-3-(2-chloro-3,3,3-trif-luoroprop-1-enyl)2,2-dimethylcyclopropanecarboxylate (Bifenthrin); the allethrins, for example (1RS)-3-allyl-2-methyl-4-oxocylopent-2-enyl)cyclopropanecarboxylate (bioallethrin), (1S)-allyl-2-methyl-4-oxocyclopent-2-enyl (1R,3R)-2,2-dimethyl-3-(2-methylprop-1-enyl)cyclopropanecarboxylate (S-bioallethrin), and mixtures of allethrin isomers (esbiothrin); the resmethrins, for example 5-benzyl-3-furylmethyl(IRS-3RS; IRS, 3SR)-2,2-dimethyl-3-(2-methyl-prop-1-enyl)cyclopropanecarboxylate (resmethrin), 5-benzyl-3-furylmethyl (1R,3R)-2,2-dimethyl-3-(2-methyl-prop-1-enyl)cyclopropanecarboxylate (bioresmethrin), and 2,3,5,6-tetrafluorobenzyl (1R,3S)-3-(2,2-dichlorovinyl)-2,2-dimethylcyclopropanecarboxylate (transfluthrin), 2,3,5,6-tetrafluoro-4-(methoxymethyl)benzyl (EZ)-(1RS,3RS;1RS, 3SR)-2,2-dimethyl-3-prop-1-enylcyclopropanecarboxylate (metofluthrin), and pyrethroids with a polyfluorobenzyl group.

Examples of organophosphate insecticides include, but are not limited to, 0,0-dimethyl-0-3,5,6-trichloro-2-pyridyl-phosphorothioate (Chloropyri-fos-methyl).

Examples of formamidine insecticides include, but are not limited to, N-methyl bis(2,4-xylylaminomethyl)amine (Amitraz). Examples of thiazole anthelmintics include, but are not limited to, 2,3,5,6-tetrahydro-6-phenylimidazo[2,1-b]thiazole (levamisole).

Examples of fungicides include, but are not limited to, tributyl tin oxide.

Examples of pyrazole insecticides include, but are not limited to, 3-bromo-1-(3-chloro-2-pyridinyl)-N-[4-cyano-2-methyl-6-[(methylamino)carbonyl]phenyl]-1H-pyrazole-5-carboxamide (cyantraniliprole).

Examples of fiprole insecticides include, but are not limited to, 5-amino-1-[2,6-dichloro-4-(trifluoromethyl)phenyl]-4-[(trifluoromethyl)sulfinyl]-1H-pyrazole-3-carbonitrile (fipronil) and 5-amino-1-[2,6-dichloro-4-trifluoromethyl)phenyl]-4-[(ethyl)-sulfinyl]-1H-pyrazole-3-carbonitrile (ethiprole).

Examples of tetramic acid derivatives include, but are not limited to, cis-3-(2,5-dimethlyphenyl)-8-methoxy-2-oxo-1-azaspiro[4.5]dec-3-en-4-yl-ethyl carbonate (suspirotetramat) and 2-oxo-3-(2,4,6-trimethylphenyl)-1-oxaspiro[4,4] non-3-en-4-yl 3,3-dimethylbutanoate (spiromesifen).

Examples of butenolides include, but are not limited to, 4-[[(6-chloropyridin-3-yl)methyl](2,2-difluoroethyl)amino] furan-2(5H)-one (flupyradifurone [Sivanto®]).

The formulations of the invention may contain one or more synergists. A synergist is defined as a chemical that does not possess inherent pesticidal activity, but instead promotes or enhances the effectiveness of pesticides when combined. Examples of synergists include, but are not limited to, sesame oil synergists such as sesamin, sesamolin, sesamex, and safrole, bucarpolate, dietholate, jiajizengxiaolin, octachlorodipropyl ether, piperonyl butoxide (PBO), piperonyl cyclonene, piprotal, propyl isome, sesame, ground sesame plant, sesamin, sesamolin, sesamex, safrole, sulfoxide, tribufos, and zengxiaoan.

The formulation of the invention may contain one or more emulsifiers. The emulsifier may be any suitable compound or mixture of compounds. Cationic emulsifiers can be used, but they tend to irritate the users' eyes. Anionic emulsifiers such as calcium dodecyl benzene sulphate (CDBS) or sodium di-isopropyl naphthalene sulphonate (SDNS) can also be used, but these are often not as effective at stabilizing the emulsion. Preferably, the emulsifier is a non-ionic compound, or mixture of non-ionic compounds, having an HLB (hydrophilic/lipophilic balance of 8-18. Suitable compounds include polyoxyethylene stearyl ethers (PSE), polyoxyethylene monolaurates (PEM), polyoxyethylene mono-oleates (PMO), sorbitan mono-oleate (SMO), nonylphenol ethoxylate (NPE), polyethylene glycol (PEG) and blends of oleyl ethoxylate (10 mole) and PEG20 glyceryl oleate (OE/PGO).

In a preferred embodiment, the emulsifier is polyoxyethylene (10) oleyl ether, polyoxyethylene (20) stearyl ether, ethoxylated castor oil, or polyoxyethylene (20) sorbitan monooleate.

The formulations of the invention may contain one or more surfactants. Examples of surfactants include, but are not limited to, an anionic surfactant such as sodium lauryl sulfate or lauryl sulfate, a nonionic surfactant, or an organosilicone surfactant.

The anti-foam agent may be any suitable compound or mixture of compounds. Exemplary compounds include Silcolapse 426R or Silcolapse 432 (i.e. polyorganosiloxane aqueous emulsion).

Constituents may be present in 100% by volume oil phase. Alternatively, the oil phase may comprise up to 45% by volume of the formula and the water phase may comprise up to 55% by volume of the formula wherein all other components are dissolved/dispersed in both phases. In a preferred embodiment, the oil phase is approximately 38% by volume of the formulation and the water phase is approximately 62% by volume of the formulation wherein all other constituents are dissolved/dispersed in both the oil and water phase.

The formulations of the instant invention may be used, for example, to control or prevent pest infestation. Thus, the invention comprises a method for controlling and/or preventing pest infestation comprising administering the formulation to an area susceptible to pest infestation.

Examples of pests that may be controlled by the formulations of the invention include, but are not limited to, mosquitos, flies, and other public health pests, including, but not limited to cockroaches, bedbugs, sand flies, and reduviidae. Additional examples of pests that may be controlled by the formulations of the invention include, but are not limited to, stored product pests and rural hygiene pests. The formulations of the invention may also be used to control turf, ornamental, and greenhouse pests.

Examples of the aforementioned pests include, but are not limited to insects from the phylum Arthropoda, especially from the class Arachnida, for example, *Acarus* spp., *Aceria sheldoni*, *Aculops* spp., *Aculus* spp., *Amblyomma* spp., *Amphitetranychus viennensis*, *Argas* spp., *Boophilus* spp., *Brevipalpus* spp., *Bryobia graminum*, *Bryobia praetiosa*, *Centruroides* spp., *Chorioptes* spp., *Dermanyssus gallinae*, *Dermatophagoides pteronyssinus*, *Dermatophagoides farinae*, *Dermacentor* spp., *Eotetranychus* spp., *Epitrimerus pyri*, *Eutetranychus* spp., *Eriophyes* spp., *Glycyphagus domesticus*, *Halotydeus destructor*, *Hemitarsonemus* spp., *Hyalomma* spp., *Ixodes* spp., *Latrodectus* spp., *Loxosceles* spp., *Metatetranychus* spp., *Neutrombicula autumnalis*, *Nuphersa* spp., *Oligonychus* spp., *Ornithodorus* spp., *Ornithonyssus* spp., *Panonychus* spp., *Phyllocoptruta oleivora*, *Polyphagotarsonemus latus*, *Psoroptes* spp., *Rhipicephalus* spp., *Rhizoglyphus* spp., *Sarcoptes* spp., from the order or the class Collembola, for example, *Onychiurus armatus*;

from the class Diplopoda, for example, *Blaniulus guttulatus*;

from the class Insecta, e.g. from the order Blattodea, for example, *Blattella asahinai*, *Blattella germanica*, *Blatta orientalis*, *Leucophaea maderae*, *Panchlora* spp., *Parcoblatta* spp., *Periplaneta* spp., *Supella longipalpa*;

from the order Coleoptera, for example, *Acalymma vittatum*, *Acanthoscelides obtectus*, *Adoretus* spp., *Agelastica alni*, *Agriotes* spp., *Alphitobius diaperinus*, *Amphimallon solstitialis*, *Anobium punctatum*, *Anoplophora* spp., *Anthonomus* spp., *Anthrenus* spp., *Apion* spp., *Apogonia* spp., *Atomaria* spp., *Attagenus* spp., *Bruchidius obtectus*, *Bruchus* spp., *Cassida* spp., *Cerotoma trifurcata*, *Ceutorrhynchus* spp., *Chaetocnema* spp., *Cleonus mendicus*, *Conoderus* spp., *Cosmopolites* spp., *Costelytra zealandica*, *Ctenicera* spp., *Curculio* spp., *Cryptolestes ferrugineus*, *Cryptorhynchus lapathi*, *Cylindrocopturus* spp., *Dermestes* spp., *Diabrotica* spp., *Dichocrocis* spp., *Dicladispa armigera*, *Diloboderus* spp., *Epilachna* spp., *Epitrix* spp., *Faustinus* spp., *Gibbium psylloides*, *Gnathocerus cornutus*, *Hellula undalis*, *Heteronychus arator*, *Heteronyx* spp., *Hylamorpha elegans*, *Hylotrupes bajulus*, *Hypera postica*, *Hypomeces squamosus*, *Hypothenemus* spp., *Lachnosterna consanguinea*, *Lasioderma serricorne*, *Latheticus oryzae*, *Lathridius* spp., *Lema* spp., *Leptinotarsa decernlineata*, *Leucoptera* spp., *Lissorhoptrus oryzophilus*, *Lixus* spp., *Luperodes* spp., *Lyctus* spp., *Megascelis* spp., *Melanotus* spp., *Meligethes aeneus*, *Melolontha* spp., *Migdolus* spp., *Monochamus* spp., *Naupactus xanthographus*, *Necrobia* spp., *Niptus hololeucus*, *Oryctes rhinoceros*, *Oryzaephilus surinamensis*, *Oryzaphagus oryzae*, *Otiorrhynchus* spp., *Oxycetonia jucunda*, *Phaedon cochleariae*, *Phyllophaga* spp., *Phyllophaga helleri*, *Phyllotreta* spp., *Popillia japonica*, *Premnotrypes* spp., *Prostephanus truncatus*, *Psylliodes* spp., *Ptinus* spp., *Rhizobius ventralis*, *Rhizopertha dominica*, *Sitophilus* spp., *Sitophilus oryzae*, *Sphenophorus* spp., *Stegobium paniceum*, *Stemechus* spp., *Symphyletes* spp., *Tanymecus* spp., *Tenebrio molitor*, *Tenebrioides mauretanicus*, *Tribolium* spp., *Trogoderma* spp., *Tychius* spp., *Xylotrechus* spp., *Zabrus* spp.;

from the order Diptera, for example, *Aedes* spp., *Agromyza* spp., *Anastrepha* spp., *Anopheles* spp., *Asphondylia* spp., *Bactrocera* spp., *Bibio hortulanus*, *Calliphora erythrocephala*, *Calliphora vicina*, *Ceratitis capitata*, *Chironomus* spp., *Chrysomyia* spp., *Chrysops* spp., *Chrysozona pluvialis*, *Cochliomyia* spp., *Contarinia* spp., *Cordylobia anthropophaga*, *Cricotopus sylvestris*, *Culex* spp., *Culicoides* spp., *Culiseta* spp., *Cuterebra* spp., *Dacus oleae*, *Dasyneura* spp., *Delia* spp., *Dermatobia hominis*, *Drosophila* spp., *Echinocnemus* spp., *Fannia* spp., *Gasterophilus* spp., *Glossina* spp., *Haematopota* spp., *Hydrellia* spp., *Hydrellia griseola*, *Hylemya* spp., *Hippobosca* spp., *Hypoderma* spp., *Liriomyza* spp., *Lucilia* spp., *Lutzomyia* spp., *Mansonia* spp., *Musca* spp., *Oestrus* spp., *Oscinella frit*, *Paratanytarsus* spp., *Paralauterborniella subcincta*, *Pegomyia* spp., *Phlebotomus* spp., *Phorbia* spp., *Phormia* spp.,

*Piophila casei, Prodiplosis* spp., *Psila rosae, Rhagoletis* spp., *Sarcophaga* spp., *Simulium* spp., *Stomoxys* spp., *Tabanus* spp., *Tetanops* spp., *Tipula* spp.;

from the order Heteroptera, for example, *Anasa tristis, Antestiopsis* spp., *Boisea* spp., *Blissus* spp., *Calocoris* spp., *Campylomma livida, Cavelerius* spp., *Cimex* spp., *Collaria* spp., *Creontiades dilutus, Dasynus piperis, Dichelops furcatus, Diconocoris hewetti, Dysdercus* spp., *Euschistus* spp., *Eurygaster* spp., *Heliopeltis* spp., *Horcias nobilellus, Leptocorisa* spp., *Leptocorisa varicornis, Leptoglossus phyllopus, Lygus* spp., *Macropes excavatus, Miridae, Monalonion atratum, Nezara* spp., *Oebalus* spp., *Pentomidae, Piesma quadrata, Piezodorus* spp., *Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp.;

from the order Homoptera, for example, *Acizzia acaciaebaileyanae, Acizzia dodonaeae, Acizzia uncatoides, Acrida turrita, Acyrthosipon* spp., *Acrogonia* spp., *Aeneolamia* spp., *Agonoscena* spp., *Aleyrodes proletella, Aleurolobus barodensis, Aleurothrixus floccosus, Allocaridara malayensis, Amrasca* spp., *Anuraphis cardui, Aonidiella* spp., *Aphanostigma piri, Aphis* spp., *Arboridia apicalis, Arytainilla* spp., *Aspidiella* spp., *Aspidiotus* spp., *Atanus* spp., *Aulacorthum solani, Bemisia tabaci, Blastopsylla occidentalis, Boreioglycaspis melaleucae, Brachycaudus helichrysi, Brachycolus* spp., *Brevicoryne brassicae, Cacopsylla* spp., *Calligypona marginata, Carneocephala fulgida, Ceratovacuna lanigera, Cercopidae, Ceroplastes* spp., *Chaetosiphon fragaefolii, Chionaspis tegalensis, Chlorita onukii, Chondracris rosea, Chromaphis juglandicola, Chrysomphalus ficus, Cicadulina mbila, Coccomytilus halli, Coccus* spp., *Cryptomyzus ribis, Cryptoneossa* spp., *Ctenarytaina* spp., *Dalbulus* spp., *Dialeurodes citri, Diaphorina cirri, Diaspis* spp., *Drosicha* spp., *Dysaphis* spp., *Dysmicoccus* spp., *Empoasca* spp., *Eriosoma* spp., *Erythroneura* spp., *Eucalyptolyma* spp., *Euphyllura* spp., *Euscelis bilobatus, Ferrisia* spp., *Geococcus coffeae, Glycaspis* spp., *Heteropsylla cubana, Heteropsylla spinulosa, Homalodisca coagulata, Hyalopterus arundinis, Icerya* spp., *Idiocerus* spp., *Idioscopus* spp., *Laodelphax striatellus, Lecanium* spp., *Lepidosaphes* spp., *Lipaphis erysimi, Macrosiphum* spp., *Macrosteles facifrons, Mahanarva* spp., *Melanaphis sacchari, Metcalfiella* spp., *Metopolophium dirhodum, Monellia costalis, Monelliopsis pecanis, Myzus* spp., *Nasonovia ribisnigri, Nephotettix* spp., *Nettigoniella spectra, Nilaparvata lugens, Oncometopia* spp., *Orthezia praelonga, Oxya chinensis, Pachypsylla* spp., *Parabemisia myricae, Paratrioza* spp., *Parlatoria* spp., *Pemphigus* spp., *Peregrinus maidis, Phenacoccus* spp., *Phloeomyzus passerinii, Phorodon humuli, Phylloxera* spp., *Pinnaspis aspidistrae, Planococcus* spp., *Prosopidopsylla flava, Protopulvinaria pyriformis, Pseudaulacaspis pentagona, Pseudococcus* spp., *Psyllopsis* spp., *Psylla* spp., *Pteromalus* spp., *Pyrilla* spp., *Quadraspidiotus* spp., *Quesada gigas, Rastrococcus* spp., *Rhopalosiphum* spp., *Saissetia* spp., *Scaphoideus titanus, Schizaphis graminum, Selenaspidus articulatus, Sogata* spp., *Sogatella furcifera, Sogatodes* spp., *Stictocephala festina, Siphoninus phillyreae, Tenalaphara malayensis, Tetragonocephela* spp., *Tinocallis caryaefoliae, Tomaspis* spp., *Toxoptera* spp., *Trialeurodes vaporariorum, Trioza* spp., *Typhlocyba* spp., *Unaspis* spp., *Viteus vitifolii, Zygina* spp.;

from the order Hymenoptera, for example, *Acromyrmex* spp., *Athalia* spp., *Atta* spp., *Diprion* spp., *Hoplocampa* spp., *Lasius* spp., *Monomorium pharaonis, Sirex* spp., *Solenopsis invicta, Tapinoma* spp., *Urocerus* spp., *Vespa* spp., *Xeris* spp.:

from the order Isopoda, for example, *Armadillidium vulgare, Oniscus asellus, Porcellio scaber;* from the order Isoptera, for example, *Coptotermes* spp., *Comitermes cumulans, Cryptotermes* spp., *Incisitermes* spp., *Microtermes obesi, Odontotermes* spp., *Reticulitermes* spp.;

from the order Lepidoptera, for example, *Achroia grisella, Acronicta major, Adoxophyes* spp., *Aedia leucomelas, Agrotis* spp., *Alabama* spp., *Amyelois transitella, Anarsia* spp., *Anticarsia* spp., *Argyroploce* spp., *Barathra brassicae, Borbo cinnara, Bucculatrix thurberiella, Bupalus piniarius, Busseola* spp., *Cacoecia* spp., *Caloptilia theivora, Capua reticulana, Carpocapsa pomonella, Carposina niponensis, Cheimatobia brumata, Chilo* spp., *Choristoneura* spp., *Clysia ambiguella, Cnaphalocerus* spp., *Cnaphalocrocis medinalis, Cnephasia* spp., *Conopomorpha* spp., *Conotrachelus* spp., *Copitarsia* spp., *Cydia* spp., *Dalaca noctuides, Diaphania* spp., *Diatraea saccharalis, Earias* spp., *Ecdytolopha aurantium, Elasmopalpus lignosellus, Eldana saccharina, Ephestia* spp., *Epinotia* spp., *Epiphyas postvittana, Etiella* spp., *Eulia* spp., *Eupoecilia ambiguella, Euproctis* spp., *Euxoa* spp., *Feltia* spp., *Galleria mellonella, Gracillaria* spp., *Grapholitha* spp., *Hedylepta* spp., *Helicoverpa* spp., *Heliothis* spp., *Hofmannophila pseudospretella* spp., *Homoeosoma* spp., *Homona* spp., *Hyponomeuta padella, Kakivoria flavofasciata, Laphygma* spp., *Laspeyresia molesta, Leucinodes orbonalis, Leucoptera* spp., *Lithocolletis* spp., *Lithophane antennata, Lobesia* spp., *Loxagrotis albicosta, Lymantria* spp., *Lyonetia* spp., *Malacosoma neustria, Maruca testulalis, Mamstra brassicae, Melanitis leda, Mocis* spp., *Monopis obviella, Mythimna separata, Nemapogon cloacellus, Nymphula* spp., *Oiketicus* spp., *Oria* spp., *Orthaga* spp., *Ostrinia* spp., *Oulema oryzae, Panolis flammea, Parnara* spp., *Pectinophora* spp., *Perileucoptera* spp., *Phthorimaea* spp., *Phyllocnistis citrella, Phyllonorycter* spp., *Pieris* spp., *Platynota stultana, Plodia interpunctella, Plusia* spp., *Plutella xylostella, Prays* spp., *Prodenia* spp., *Protoparce* spp., *Pseudaletia* spp., *Pseudaletia unipuncta, Pseudoplusia includens, Pyrausta nubilalis, Rachiplusia nu, Schoeniobius* spp., *Scirpophaga* spp., *Scirpophaga innotata, Scotia segetum, Sesamia* spp., *Sesamia inferens, Sparganothis* spp., *Spodoptera* spp., *Spodoptera praefica, Stathmopoda* spp., *Stomopteryx subsecivella, Synanthedon* spp., *Tecia solanivora, Thermesia gemmatalis, Tinea cloacella, Tinea pellionella, Tineola bisselliella, Tortrix* spp., *Trichophaga tapetzella, Trichoplusia* spp., *Tryporyza incertulas, Tuta absoluta, Virachola* spp.;

from the order Orthoptera or Saltatoria, for example, *Acheta domesticus, Dichroplus* spp., *Gryllotalpa* spp., *Hieroglyphus* spp., *Locusta* spp., *Melanoplus* spp., *Schistocerca gregaria;* from the order Phthiraptera, for example, *Damalinia* spp., *Haematopinus* spp., *Linognathus* spp., *Pediculus* spp., *Ptirus pubis, Trichodectes* spp.;

from the order Psocoptera for example *Lepinatus* spp., *Liposcelis* spp.;

from the order Siphonaptera, for example, *Ceratophyllus* spp., *Ctenocephalides* spp., *Pulex irritaris, Tunga penetrans, Xenopsylla cheopsis;* from the order Thysanoptera, for example, *Anaphothrips obscurus, Baliothrips biformis, Drepanothrips reuteri, Enneothrips flavens, Frankliniella* spp., *Heliothrips* spp., *Hercinothrips femoralis, Rhipiphorothrips cruentatus, Scirtothrips* spp., *Taeniothrips cardamomi, Thrips* spp.;

from the order Zygentoma (=Thysanura), for example, *Ctenolepisma* spp., *Lepisma saccharina*, *Lepismodes inquilinus*, *Thermobia domestica*;

from the class Symphyla, for example, *Scutigerella* spp.;

pests from the phylum Mollusca, especially from the class Bivalvia, for example, *Dreissena* spp., and from the class Gastropoda, for example, *Arion* spp., *Biomphalaria* spp., *Bulinus* spp., *Deroceras* spp., *Galba* spp., *Lymnaea* spp., *Oncomelania* spp., *Pomacea* spp., *Succinea* spp.;

animal pests being nematodes from the phylums Plathelminthes and Nematoda, for example, *Ancylostoma duodenale*, *Ancylostoma ceylanicum*, *Ancylostoma braziliensis*, *Ancylostoma* spp., *Ascaris* spp., *Brugia malayi*, *Brugia timori*, *Bunostomum* spp., *Chabertia* spp., *Clonorchis* spp., *Cooperia* spp., *Dicrocoelium* spp., *Dictyocaulus filaria*, *Diphyllobothrium latum*, *Dracunculus medinensis*, *Echinococcus granulosus*, *Echinococcus multilocularis*, *Enterobius vermicularis*, *Faciola* spp., *Haemonchus* spp., *Heterakis* spp., *Hymenolepis nana*, *Hyostrongulus* spp., *Loa*, *Nematodirus* spp., *Oesophagostomum* spp., *Opisthorchis* spp., *Onchocerca volvulus*, *Ostertagia* spp., *Paragonimus* spp., *Schistosomen* spp., *Strongyloides fuelleborni*, *Strongyloides stercoralis*, *Strongyloides* spp., *Taenia saginata*, *Taenia solium*, *Trichinella spiralis*, *Trichinella nativa*, *Trichinella britovi*, *Trichinella nelsoni*, *Trichinella pseudopsiralis*, *Trichostrongulus* spp., *Trichuris trichura*, *Wuchereria bancrofti*;

phytoparasitic pests being nematodes from the phylum Nematoda, for example, *Aphelenchoides* spp., *Bursaphelenchus* spp., *Ditylenchus* spp., *Globodera* spp., *Heterodera* spp., *Longidorus* spp., *Meloidogyne* spp., *Pratylenchus* spp., *Radopholus* spp., *Trichodorus* spp., *Tylenchulus* spp., *Xiphinema* spp., *Helicotylenchus* spp., *Tylenchorhynchus* spp., *Scutellonema* spp., *Paratrichodorus* spp., *Meloinema* spp., *Paraphelenchus* spp., *Aglenchus* spp., *Belonolaimus* spp., *Nacobbus* spp., *Rotylenchulus* spp., *Rotylenchus* spp., *Neotylenchus* spp., *Paraphelenchus* spp., *Dolichodoras* spp., *Hoplolaimus* spp., *Punctodera* spp., *Criconemella* spp., *Quinisulcius* spp., *Hemicycliophora* spp., *Hirschmaniella* spp., *Anguina* spp., *Subanguina* spp., *Hemicriconemoides* spp., *Psilenchus* spp., *Pseudohalenchus* spp., *Criconemoides* spp., *Cacopauras* spp.

Examples of areas that are susceptible to pest infestation which may be treated with the formulations of the invention include, but are not limited to, complex canopies. A complex canopy is defined as an area that is difficult to penetrate with typical pesticide formulations. Examples of complex canopies include, but are not limited to, dense vegetation and/or complex environments.

In an additional embodiment, the formulations of the instant invention can be used as a fumigant. Areas which may be treated according to this embodiment include areas of habitation. Examples of areas of habitation include, but are not limited to, indoor livestock facilities, outdoor livestock facilities, product storage areas, housing, office spaces, retail spaces, warehouses, and shipping containers.

The formulations of the instant invention are preferably wide-area space sprays applied via ULV to control mosquitoes, flies, and other public health pests. Preferably, the formulations of the instant invention can be applied via truck, backpack blower, drone, or helicopter. Examples of wide-area spaces include, but are not limited to, urban environments, greenhouses, warehouses, grain storage facilities, stables, farms, food production facilities, agricultural areas, and fields.

Formulations of the invention have been observed to provide significantly superior control of pests when applied via ULV. Specifically, it was discovered that formulations of the invention provide exceptional bio-efficacy, measured by mortality, in the absence of currently registered pesticides.

In a preferred embodiment, application of the formulations of the invention via ULV provides a total average droplet density of $\geq 0.3$ drops/mm$^2$/fl oz of applied product. In a more preferred embodiment, application of the formulations of the invention via ULV provides a total average droplet density of $\geq 0.4$ drops/mm$^2$/fl oz of applied product. In a more preferred embodiment, application of the formulations of the invention via ULV provides a total average droplet density of $\geq 0.5$ drops/mm$^2$/fl oz of applied product. In a more preferred embodiment, application of the formulations of the invention via ULV provides a total average droplet density of $\geq 0.7$ drops/mm$^2$/fl oz of applied product. In a more preferred embodiment, application of the formulations of the invention via ULV provides a total average droplet density of $\geq 1$ drop/mm$^2$/fl oz of applied product.

In an additional preferred embodiment, application of the formulations of the invention via ULV provides a variance in droplet density over a distance of 300 feet of 0.1 or less. In a more preferred embodiment, application of the formulations of the invention via ULV provides a variance in droplet density over a distance of 300 feet of 0.01 or less. In a more preferred embodiment, application of the formulations of the invention via ULV provides a variance in droplet density over a distance of 300 feet of 0.001 or less. In a more preferred embodiment, application of the formulations of the invention via ULV provides a variance in droplet density over a distance of 300 feet of 0.0005 or less.

The following Examples describe exemplary embodiments of the invention. These Examples should not be interpreted to encompass the entire breadth of the invention.

EXAMPLES

Example 1: Efficacy of Non-VOC Solvent Formulation Applied Via Hand-Held ULV Sprayer Against *Aedes aegypti*

The efficacy of a non-VOC solvent formulation of the invention was evaluated using an electric, hand-held ULV sprayer against laboratory-reared *Aedes aegypti*. The non-VOC solvent formulation of the invention (Formulation 1) was applied at a rate of 37 ml/min from a distance of 50 ft. This experiment was performed in duplicate (Exp 1 & 2). Control cages were held up-wind of the application and were exposed to the same environmental conditions but received no treatment.

Mortality was assessed at three time points: 15 minutes following treatment; 50 minutes following treatment; and 24 hours following treatment. The findings are presented below in Table 1.

TABLE 1

| Product | Solvent | Time after Application | Live | Dead |
| --- | --- | --- | --- | --- |
| Formulation 1 (Exp 1) | Acetyl tributyl citrate | 15 min | 0 | 63 |
| | | 50 min | 0 | 63 |
| | | 24 hr | 0 | 63 |
| Formulation 1 (Exp 2) | Acetyl tributyl citrate | 15 min | 2 | 28 |
| | | 50 min | 1 | 29 |
| | | 24 hr | 0 | 30 |
| Control | N/A | 15 min | 20 | 0 |
| | | 50 min | 20 | 0 |
| | | 24 hr | 20 | 0 |

As illustrated in the above table, a non-VOC formulation of the invention displayed 100% efficacy within 24 hours after application despite the absence of active ingredient.

This experiment was repeated as described above except a gas-powered, hand-held ULV sprayer was used to apply the formulations and different concentrations of acetyl tributyl citrate were tested. The findings are presented below in Tables 2 and 3.

TABLE 2

| Product | Concentration | Time after Application | Live | Dead |
|---|---|---|---|---|
| Formulation 1 (Exp 1) | 100% acetyl tributyl citrate | 15 min | 0 | 28 |
|  |  | 60 min | 0 | 28 |
|  |  | 24 hr | 0 | 28 |
| Formulation 1 (Exp 2) | 100% acetyl tributyl citrate | 15 min | 1 | 25 |
|  |  | 60 min | 0 | 26 |
|  |  | 24 hr | 0 | 26 |
| Control | N/A | 15 min | 25 | 0 |
|  |  | 60 min | 25 | 0 |
|  |  | 24 hr | 24 | 1 |

TABLE 3

| Product | Concentration | Time after Application | Live | Dead |
|---|---|---|---|---|
| Formulation 1 (Exp 1) | 32% acetyl tributyl citrate | 15 min | 4 | 26 |
|  |  | 60 min | 1 | 29 |
|  |  | 24 hr | 0 | 30 |
| Formulation 1 (Exp 2) | 32% acetyl tributyl citrate | 15 min | 5 | 20 |
|  |  | 60 min | 2 | 23 |
|  |  | 24 hr | 0 | 25 |

TABLE 3-continued

| Product | Concentration | Time after Application | Live | Dead |
|---|---|---|---|---|
| Control | N/A | 15 min | 22 | 0 |
|  |  | 60 min | 22 | 0 |
|  |  | 24 hr | 22 | 0 |

Table 2 replicates the studies from the initial experiment illustrated in Table 1. As in the previous study, 100% mortality was noted within 24 hours. The findings of Table 3 demonstrate that a 32% by volume acetyl tributyl citrate in an aqueous formulation results in 100% mortality within 24 hours.

Example 2: Efficacy of Non-VOC Solvent Formulation Applied Directly Against *Culex quinquefasciatus* and *Aedes aegypti*

The efficacy of a non-VOC solvent formulation of the invention was evaluated using a pump-sprayer against *Culex quinquefasciatus* and *Aedes aegypti*. The non-VOC solvent formulation of the invention comprising acetyl tributyl citrate (Formulation 1) was applied at a concentration of either 15.75 mg/ml or 31.5 mg/ml from a distance of approximately 15 cm. Controls were sprayed with water. The experiment was replicated five times and ten insects were sprayed per replicate.

Percentage knock-down and/or mortality was determined at three time points: 30 minutes following treatment; 1 hour following treatment; and 24 hours following treatment. The findings are presented below in Tables 4 and 5.

TABLE 4

% knock down and/or mortality of *Culex quinquefasciatus* (out of 10 per replicate) after direct spray treatment

| | Formulation 1 31.5 mg/ml* | | | | | Formulation 1 15.75 mg/ml* | | | | | Control | | | | |
|---|---|---|---|---|---|---|---|---|---|---|---|---|---|---|---|
| efficacy after | 1 | 2 | 3 | 4 | 5 | 1 | 2 | 3 | 4 | 5 | 1 | 2 | 3 | 4 | 5 |
| 30 minutes | 0 | 0 | 0 | 0 | 0 | 0 | 0 | 0 | 0 | 0 | 0 | 0 | 0 | 0 | 0 |
| 1 hour | 0 | 0 | 0 | 0 | 0 | 0 | 0 | 0 | 0 | 0 | 0 | 0 | 0 | 0 | 0 |
| 24 hour mortality | 10 | 20 | 70 | 30 | 50 | 10 | 0 | 0 | 0 | 0 | 0 | 0 | 0 | 0 | 0 |

*Concentration of acetyl tributyl citrate in space spray

TABLE 5

% knock down and/or mortality of *Aedes aegypti* (out of 10 per replicate) after direct spray treatment:

| | Formulation 1 31.5 mg/ml* | | | | | Formulation 1 15.75 mg/ml* | | | | | Control | | | | |
|---|---|---|---|---|---|---|---|---|---|---|---|---|---|---|---|
| efficacy after | 1 | 2 | 3 | 4 | 5 | 1 | 2 | 3 | 4 | 5 | 1 | 2 | 3 | 4 | 5 |
| 30 minutes | 0 | 0 | 0 | 0 | 0 | 0 | 0 | 0 | 0 | 0 | 0 | 0 | 0 | 0 | 0 |
| 1 hour | 0 | 0 | 0 | 0 | 0 | 0 | 0 | 0 | 0 | 0 | 0 | 0 | 0 | 0 | 0 |
| 24 hour mortality | 60 | 10 | 40 | 50 | 50 | 0 | 10 | 0 | 0 | 0 | 0 | 0 | 0 | 0 | 0 |

*Concentration of acetyl tributyl citrate in space spray

The above data confirm that non-VOC formulations comprising acetyl tributyl citrate are effective at killing both *Aedes aegypti* and *Culex quinquefasciatus*.

Further studies were conducted using acetyl tributyl citrate as described in Table 6.

TABLE 6

% knock down and/or mortality of *Aedes aegypti* (out of 10 per replicate) after direct spray treatment:

| efficacy after | Citroflex A-4 Many spray pushes pure Citroflex A4 (1 ml) | | | | | Citroflex A-4 One spray push pure Citroflex A4 (1 ml) | | | | | Citroflex A-4 One spray push Citroflex 1:1 with tap water | | | | |
|---|---|---|---|---|---|---|---|---|---|---|---|---|---|---|---|
| | 1 | 2 | 3 | 4 | 5 | 1 | 2 | 3 | 4 | 5 | 1 | 2 | 3 | 4 | 5 |
| 1 hour | 100 | | | | | 100 | | | | | 100 | | | | |
| 24 hour mortality | 100 | | | | | 100 | | | | | 100 | | | | |

Example 3: Residual Efficacy of Non-VOC Solvent Formulation Applied Against *Culex quinquefasciatus*

The residual efficacy of a non-VOC solvent formulation of the invention was evaluated against *Culex quinquefasciatus*. The non-VOC solvent formulation of the invention comprising acetyl tributyl citrate (Formulation 1) was applied to either tissue or glazed tiles at a concentration of either 15.75 mg/ml or 31.5 mg/ml (1.12 ml per surface; 225 cm$^2$ tile/tissue). Positive controls were treated with Bay Bay fly, which is a mixture of octamethylcyclotetrasiloxan (D4) (75% by volume) and decamethylcyclopentasiloxan (D5) (25% by volume). The experiment was replicated four times and ten insects were sprayed per replicate.

Percentage knock-down and/or mortality was determined at three time points: 30 minutes following treatment; 1 hour following treatment; and 24 hours following treatment. The findings are presented below in Tables 7 and 8.

The above data confirm that there is no residual activity of non-VOC formulations comprising acetyl tributyl citrate.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

TABLE 7

Residual efficacy on treated tissues: % knock down and/or mortality of *Culex quinquefasciatus* (out of 10 per replicate)

| efficacy after | Formulation 1 31.5 mg/ml 1.12 ml/225 cm$^2$ | | | | | Formulation 1 15.75 mg/ml 1.12 ml/225 cm$^2$ | | | | | Bay Bay fly 1.12 ml/225 cm$^2$ | | | | |
|---|---|---|---|---|---|---|---|---|---|---|---|---|---|---|---|
| | 1 | 2 | 3 | 4 | 5 | 1 | 2 | 3 | 4 | 5 | 1 | 2 | 3 | 4 | 5 |
| 30 minutes | 0 | 0 | 0 | 0 | | 10 | 10 | 0 | 0 | | 50 | 100 | 50 | 60 | |
| 1 hour | 0 | 0 | 0 | 0 | | 10 | 0 | 20 | 0 | | 100 | 100 | 100 | 100 | |
| 24 hour mortality | 0 | 0 | 0 | 0 | | 0 | 0 | 20 | 0 | | 100 | 100 | 100 | 90 | |

TABLE 8

Residual efficacy on treated glazed tiles: % knock down and/or mortality of *Culex quinquefasciatus* (out of 10 per replicate)

| test point | efficacy after | Formulation 1 31.5 mg/ml 1.12 ml/225 cm$^2$ | | | | | Formulation 1 15.75 mg/ml 1.12 ml/225 cm$^2$ | | | | | Bay Bay fly 1.12 ml/225 cm$^2$ | | | | |
|---|---|---|---|---|---|---|---|---|---|---|---|---|---|---|---|---|
| | | 1 | 2 | 3 | 4 | 5 | 1 | 2 | 3 | 4 | 5 | 1 | 2 | 3 | 4 | 5 |
| | 30 minutes | 0 | 0 | 0 | 0 | | 0 | 30 | 0 | 0 | | 0 | 0 | 0 | 0 | |
| | 1 hour | 0 | 0 | 0 | 0 | | 0 | 0 | 0 | 0 | | 0 | 0 | 0 | 0 | |
| | 24 hour mortality | 0 | 0 | 0 | 0 | | 0 | 0 | 0 | 0 | | 0 | 0 | 0 | 0 | |

The invention claimed is:

1. A method for controlling or preventing pest infestation, the method comprising spraying a water-based pesticidal formulation in an area susceptible to pest infestation, wherein the formulation comprises about 32% or greater acetyl tributyl citrate, wherein the formulation comprises 16% volatile organic compound (VOC) by weight or less, and wherein the formulation does not contain currently registered pesticides.

2. A method for controlling or preventing pest infestation, the method comprising spraying a water-based pesticidal formulation in an area susceptible to pest infestation, wherein the formulation comprises about 32% or greater acetyl tributyl citrate, wherein the formulation is VOC-exempt, and wherein the formulation does not contain currently registered pesticides.

3. The method of claim 1, wherein the formulation is an ultra-low volume concentrate.

4. The method of claim 1, wherein the pest is selected from the group consisting of: a mosquito, a fly, a cockroach, a bedbug, a sand fly, and a reduviidae.

5. The method of claim 1, wherein the area susceptible to pest infestation is a complex canopy.

6. The method of claim 1, wherein administration of the formulation provides a total average droplet density of ≥0.3 drops/mm2/fl oz of applied product.

7. The method of claim 1, wherein administration of the formulation provides a variance in droplet density over a distance of 300 feet of 0.1 or less.

8. The method of claim 1, wherein the formulation contains no VOC.

9. The method of claim 1, wherein the formulation further comprises an essential oil.

10. The method of claim 1, wherein the formulation comprises one or more of the following: an essential oil, an active ingredient eligible for minimum risk exemption regulations of the EPA (40 CFR 152.25(f)(1)), a humectant, an emulsifier, a surfactant, an antifoam agent, and/or a preservative.

11. The method of claim 1, wherein the formulation further comprises at least one synergist selected from the group consisting of: bucarpolate, sesame oil synergists, dietholate, jiajizengxiaolin, octachlorodipropyl ether, piperonyl butoxide (PBO), piperonyl cyclonene, piprotal, propyl isome, sesame, sesamolin, sulfoxide, tribufos, and zengxiaoan.

12. The method of claim 1, wherein the pest is an insect.

13. The method of claim 1, wherein the pest is a mosquito.

14. The method of claim 1, wherein the composition comprises a sesame oil synergist selected from sesamin and sesamolin.

15. The method of claim 1, wherein the formulation comprises one or more pesticides eligible for minimum risk exemption regulations of the EPA (40 C.F.R. 152.25(f)(1)).

16. The method of claim 15, wherein the one or more pesticides eligible for minimum risk regulations of the EPA (40 C.F.R. 152.25(f)(1)) is selected from the group consisting of: castor oil, cedarwood oil, cedarwood oil (China), cedarwood oil (Texas), cedarwood oil (Virginia), cinnamon, cinnamon oil, citric acid (2-hydroxypropane-1,2,3-tricarboxylic acid), citronella, citronella oil, cloves, clove oil, corn gluten meal, corn oil, cornmint, cornmint oil, cottonseed oil, dried blood, eugenol (4-allyl-2 methoxyphenol), garlic, garlic oil, geraniol (2E)-3,7-dimethylocta-2,6-dien-1-ol), geranium oil, lauryl sulfate lemongrass oil, linseed oil, malic acid (2-hydroxybutanedioic acid), peppermint, peppermint oil, 2-phenylethyl propionate, potassium sorbate (potassium (2E,4E)-hexa-2,4-dienoate), putrescent whole egg solids, rosemary, rosemary oil, sesame, sesame oil, sodium chloride, sodium lauryl sulfate (sulfuric acid monododecyl ester, sodium salt), soybean oil, spearmint, spearmint oil, thyme, thyme oil, white pepper, and zinc.

17. The method of claim 1, wherein the formulation comprises one or more of castor oil, cedarwood oil, cedarwood oil (China), cedarwood oil (Texas), cedarwood oil (Virginia), cinnamon, cinnamon oil, citric acid (2-hydroxypropane-1,2,3-tricarboxylic acid), citronella, citronella oil, cloves, clove oil, corn gluten meal, corn oil, cornmint, cornmint oil, cottonseed oil, dried blood, eugenol (4-allyl-2 methoxyphenol), garlic, garlic oil, geraniol (2E)-3,7-dimethylocta-2,6-dien-1-ol), geranium oil, lauryl sulfate lemongrass oil, linseed oil, malic acid (2-hydroxybutanedioic acid), peppermint, peppermint oil, 2-phenylethyl propionate, potassium sorbate (potassium (2E,4E)-hexa-2,4-dienoate), putrescent whole egg solids, rosemary, rosemary oil, sesame, sesame oil, sodium chloride, sodium lauryl sulfate (sulfuric acid monododecyl ester, sodium salt), soybean oil, spearmint, spearmint oil, thyme, thyme oil, white pepper, and/or zinc.

18. The method of claim 17, wherein the formulation comprises one of more of cinnamon oil, cloves, clove oil, sesame, sesame oil, soybean oil, thyme, and/or thyme oil.

19. The method of claim 1, wherein the formulation is free of all pesticides except the acetyl tributyl citrate.

20. A method for controlling pest infestation, the method comprising spraying a water-based pesticidal formulation in an area susceptible to pest infestation, wherein the formulation comprises acetyl tributyl citrate, wherein the formulation comprises 16% volatile organic compound (VOC) by weight or less, wherein the formulation does not contain currently registered pesticides, wherein the method results in mortality of the pest within 24 hours wherein the formulation comprises about 32% or greater acetyl tributyl citrate.

21. The method of claim 20, wherein the formulation contains no VOC.

22. The method of claim 20, wherein the formulation comprises one or more of the following: an essential oil, an active ingredient eligible for minimum risk exemption regulations of the EPA (40 CFR 152.25(f)(1)), a humectant, an emulsifier, a surfactant, an antifoam agent, and/or a preservative.

23. The method of claim 20, wherein the pest is an insect.

24. The method of claim 20, wherein the pest is a mosquito.

25. The method of claim 20, wherein the formulation comprises one or more of castor oil, cedarwood oil, cedarwood oil (China), cedarwood oil (Texas), cedarwood oil (Virginia), cinnamon, cinnamon oil, citric acid (2-hydroxypropane-1,2,3-tricarboxylic acid), citronella, citronella oil, cloves, clove oil, corn gluten meal, corn oil, cornmint, cornmint oil, cottonseed oil, dried blood, eugenol (4-allyl-2 methoxyphenol), garlic, garlic oil, geraniol (2E)-3,7-dimethylocta-2,6-dien-1-ol), geranium oil, lauryl sulfate lemongrass oil, linseed oil, malic acid (2-hydroxybutanedioic acid), peppermint, peppermint oil, 2-phenylethyl propionate, potassium sorbate (potassium (2E,4E)-hexa-2,4-dienoate), putrescent whole egg solids, rosemary, rosemary oil, sesame, sesame oil, sodium chloride, sodium lauryl sulfate (sulfuric acid monododecyl ester, sodium salt), soybean oil, spearmint, spearmint oil, thyme, thyme oil, white pepper, and/or zinc.

26. The method of claim 25, wherein the formulation comprises one of more of cinnamon oil, cloves, clove oil, sesame, sesame oil, soybean oil, thyme, and/or thyme oil.

27. The method of claim 20, wherein the method results in mortality of the pest within 15 minutes.

28. The method of claim 20, wherein the formulation is free of all pesticides except the acetyl tributyl citrate.

* * * * *